March 24, 1964  J. J. DRITTENBASS  3,126,307
METHOD OF SEALING THERMOPLASTIC MATERIALS BY DIELECTRIC HEATING
Filed March 10, 1958
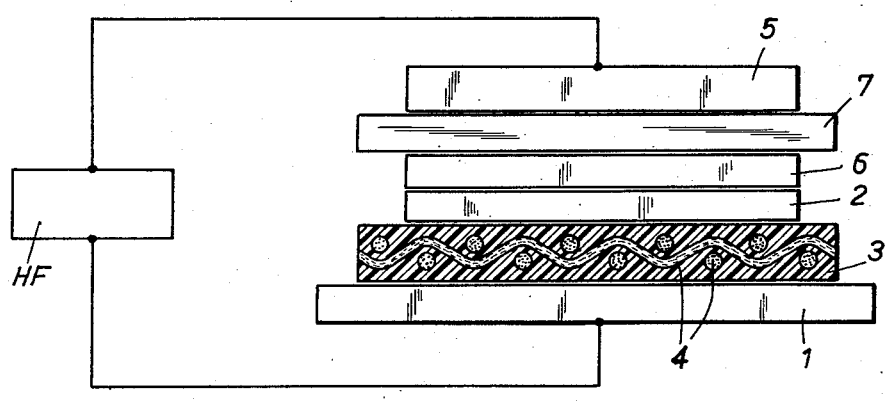

United States Patent Office 3,126,307
Patented Mar. 24, 1964

3,126,307
METHOD OF SEALING THERMOPLASTIC MATERIALS BY DIELECTRIC HEATING
Jakob Jonathan Drittenbass, Burgstrasse 47,
Sankt Gallen, Switzerland
Filed Mar. 10, 1958, Ser. No. 720,112
6 Claims. (Cl. 156—273)

The present invention relates to an improved method for joining two portions of a thermoplastic material, such as polyethylene, polypropylene and the like.

Heretofore a high frequency electric field has been employed to join two portions of a thermoplastic material by the use of buffer materials between the electrodes and the material to be joined. In the methods heretofore described, a buffer material has been used to offset and reduce the effects of variations in the thickness or quality of the materials to be welded which might change the field qualities. Buffer material has been used to weld plastic materials having a dielectric loss factor too low to obtain a welding temperature sufficiently high by direct heating. In this case a buffer material with a high dielectric loss factor is heated and the heat generated is transferred to the material to be welded. A long-chain, synthetic, polymeric amide with recurring amide groups as an integral part of the main polymer chain and with a softening point of at least 100 degrees F. above the softening point of polyethylene or other materials to be joined has been considered particularly suitable for use as a buffer material. Cellulose acetate has also been described as suitable for use as a buffer material. A high frequency electrode having a composite facing consisting of an inner layer of high-loss factor, inorganic insulating material having an open fibrous structure and an outer layer of high-loss factor, heat-stable, insulating material having a non-fibrous structure has been used in an apparatus for welding thermoplastic material by the action of a high frequency field of electric force.

Although the methods described above and others have achieved some acceptance in the art, there are certain disadvantages inherent therein. The methods of the prior art yield unsatisfactory results in practice when tubes of thin-walled plastic materials filled with liquids, and particularly aqueous liquids, are welded across the width of the tube while the area to be welded is in contact with the liquid. Under these circumstances welded joints having a sufficient degree of mechanical strength cannot be obtained by the methods heretofore described.

It is the principal object of the present invention to provide a method for welding thin-walled plastic materials and it is a more specific object of this invention to provide a method for welding thin-walled plastic materials in the form of a tube, which are filled with liquids and in which the weld is made across the width of the tube while the liquid is in contact with the area to be welded.

Additional objects and advantages will become apparent from the following description taken in conjunction with the drawing in which an embodiment of the invention is shown partly in cross section and partly in diagrammatic form.

In its broadest aspect the invention consists of a process for welding two portions of a thermoplastic material such as polyethylene, polypropylene, polyamide, or polyesters including carbonic acid polyesters such as described in "Angewandte Chemie," volume 68, pages 633–640 (1956), by the use of a buffer material having a softening point not substantially above the welding temperature, and on one side only of the thermoplastic material to be welded. The buffer material is preferably impregnated into a closely-woven organic fabric. An insulating sheet consisting of a sheet of plastic material having a dielectric loss factor low enough so that it does not soften at the welding temperature is positioned on the other side of the material to be welded. The buffer material and the insulating sheet are required to be of such a nature that they cannot be welded to each other at the temperature at which the welding is accomplished.

The buffer material which is suitable for use in the process of this invention is a polyvinyl chloride having a dielectric loss factor of at least 0.10 and preferably at least 0.5. If the dielectric loss is less than 0.1 the welding time is uneconomically long. The most satisfactory polyvinyl chloride has a high content of plasticizers which soften below the welding temperature. The presence of the plasticizers causes the polyvinyl chloride to have a softening temperature substantially equal to or lower than the thermoplastic materials that are to be welded. In the preferred form, the polyvinyl chloride is impregnated into a relatively closely-woven, organic fabric in such a manner that there are substantially no open or unfilled interstitial spaces, whereby sufficient mechanical stability is given to the buffer material to prevent the polyvinyl chloride from flowing away from the area of the weld at the temperature to which it is heated at the time welding is accomplished. A closely woven cotton fabric is preferred for use with the buffer material, but wool, cellulose acetate, and other organic fabrics may be used.

In one preferred form, the buffer material consists of a closely-woven, organic fabric impregnated with a polyvinyl chloride containing a relatively large amount of plasticizers and having a softening point lower than and not substantially above the softening point of the material to be welded and a layer on top of the impregnated fabric of a polyvinyl chloride having a lesser amount of plasticizers and a softening point above the softening point of the material to be welded. It is also contemplated that a plurality of layers of polyvinyl chloride may be superposed on top of the impregnated fabrics with each additional layer having a lesser amount of plasticizer and a higher softening point.

The insulating sheet consists of a heat resistant sheet of plastic material having a dielectric loss factor low enough to avoid softening at the welding temperature. The dielectric loss factor of the insulating sheet is preferably not greater than about 0.1. If the dielectric loss factor of the insulating sheet is above about 0.01, it becomes heated at the conditions at which welding of the thermoplastic material is effective, but if the dielectric loss factor is not greater than about 0.01, the insulating sheet remains relatively cold during the welding and consequently does not become softened so that the electrode which is pressed against the insulating sheet does not sink into it. Sheets composed of a polyamide such as nylon, polyester, polyethylene and cellulose acetate are suitable for use as an insulating sheet. A sheet composed of polyvinylacetate is preferred for use as the insulating sheet.

The combination described above of a buffer material on one side and an insulating sheet on the other side of the thermoplastic material to be welded provides excellent welding of tubes filled with an aqueous solution even when the aqueous solution is in contact with the proportion of the thermoplastic material to be welded at the time welding is effected. The combination is particularly suitable for use in welding thermoplastic material having a wall thickness within the range of from 0.005 to 2.0 millimetres, such as sheets or tubes of polyethylene, polypropylene, polyamides and polyesters including carbonic acid polyesters such as those referred to hereinbefore. Because of the high dielectric loss of the buffer material described above, the field strength can be relatively low and substantially below the break-down potential of the combination of the thermoplastic materials to be welded, the buffer material, and the insulating sheet. It is important for the field strength to be substantially below the break down potential because very narrow mechanical differences in sheet thickness occur in thin-walled sheets of thermoplastic materials and if the break-down potential is close to the working potential arcing over frequently occurs and this results in incompletely sealed spots at the area of the weld. Polyvinyl chloride warms up during a sufficiently short period of time to permit low field strengths to be used because of its high dielectric loss factor. The low field strength is facilitated by the use of frequencies within the range of from 27 to 200, and preferably 40 to 120 megacycles. Under these conditions there are practically no breakdowns, the buffer material may be used for at least 500 to 1,000 weldings and the welded joints produced are water-proof and have a tensile strength substantially greater than that of the unwelded material.

In sealing two portions of thermoplastic material the portions are placed between electrodes 1 and 5, as shown in the accompanying drawing, with the buffer material 3 consisting of impregnated organic fabric 4 positioned between the electrode 1 and the thermoplastic sheets 2 and 6, and the insulating sheet 7 positioned between the other electrode 5 and the thermoplastic sheets. The electrodes are brought together to either side of the thermoplastic sheets, thus bringing the buffer material and the insulating sheet into contact with the thermoplastic material. A high frequency voltage HF is impressed across the electrodes thereupon heating the buffer and the thermoplastic material. As the thermoplastic material softens, the pressure between the electrodes causes some flowing of the thermoplastic materials so that the two sheets or the two walls of a flat tube are welded together along the desired line. When the softening and welding have taken place, the imposed voltage is removed and the heated thermoplastic material then cools relatively rapidly because of the small mass of material that has been heated. The rapid cooling causes a smooth, even weld to be made along the desired lines and reduces the time to effect the welding. After the material has cooled sufficiently to become self-sustaining, the pressure between the electrodes is released.

It will be apparent that the described method may be modified and such modifications will be apparent to those skilled in the art, and therefore it is intended that the described method should not be construed as imposing unnecessary limitations on the appended claims.

I claim:

1. A method of joining two portions of a thermoplastic material having a low dielectric loss factor including the steps of placing said portions together; placing a buffer material between an electrode and the portions and in contact therewith, said buffer material being a reinforced plastic material with a dielectric loss factor of at least 0.1 and a softening point not above a temperature substantially equal to the softening point of the material to be sealed so that the buffer material and the thermoplastic material both soften to about the same degree when the two materials are pressed together and a given high frequency electric field is impressed across them, said buffer material having the property of not sticking to said thermoplastic material when said materials are pressed together and said buffer material is heated to the softening point of the thermoplastic material; placing a heat resistant insulating material between the counter-electrode and said portions and in contact therewith, said insulating material having a relatively low dielectric loss factor; pressing an area of the buffer material, the insulating material and said portions against each other, and impressing a high frequency electric field across said area; removing the high frequency electric field after the buffer material and the thermoplastic material have softened, and subsequently discontinuing pressing the said area after the thermoplastic material has become self-sustaining.

2. A method according to claim 1 in which the buffer material has a dielectric loss factor of at least 0.5 and the insulating sheet has a dielectric loss factor of not greater than about 0.01.

3. A method according to claim 1 in which the buffer material has a dielectric loss factor of at last 0.5 and the insulating sheet has a dielectric loss factor of not greater than about 0.01, and in which the buffer material is impregnated into a closely-woven, organic fabric with substantially no unfilled interstitial spaces in the fabric.

4. A method according to claim 1, in which the buffer material has a dielectric loss factor of at least 0.5 and the insulating sheet has a dielectric loss factor of not greater than about 0.01, and in which the buffer material is impregnated into a closely-woven, cotton fabric with substantially no unfilled interstitial spaces in the fabric.

5. A method of joining two portions of a thermoplastic material having a low dielectric loss factor including the steps of placing said portions together; placing a buffer material between an electrode and the portions and in contact therewith, said buffer material being a reinforced plastic material with a dielectric loss factor of at least 0.1 and a softening point not above a temperature substantially equal to the softening point of the material to be sealed so that the buffer material and the thermoplastic material both soften to about the same degree when the two materials are pressed together and a given high frequency electric field is impressed across them, said buffer material having the property of not sticking to said thermoplastic material when said materials are pressed together and said buffer material is heated to the softening point of the thermoplastic material; placing a heat-resistant insulating material between the counter-electrode and said portions and in contact therewith, said insulating material having a relatively low dielectric loss factor; pressing an area of the buffer material, the insulating material and said portions against each other and impressing an electric field across said area having a frequency within the range of from 20 to 200 megacycles; removing said high frequency electric field after the buffer material and the thermoplastic material have softened, and subsequently discontinuing pressing the said area after the thermoplastic material has become self-sustaining.

6. A process according to claim 5 in which the frequency of the electric fields impressed across the area to be welded is within the range of from 40 to 120 megacycles.

References Cited in the file of this patent

UNITED STATES PATENTS

| | | |
|---|---|---|
| 2,407,833 | Jablonsky | Sept. 17, 1946 |
| 2,463,054 | Quayle et al. | Mar. 1, 1949 |
| 2,498,027 | Brown | Feb. 21, 1950 |
| 2,550,006 | Dreyfus | Apr. 24, 1951 |
| 2,638,963 | Frederick et al. | May 19, 1953 |
| 2,646,105 | Langer | July 21, 1953 |
| 2,667,437 | Zoubek | Jan. 26, 1954 |
| 2,730,161 | Langer | Jan. 10, 1956 |

UNITED STATES PATENT OFFICE
CERTIFICATE OF CORRECTION

Patent No. 3,126,307                                      March 24, 1964

Jakob Jonathan Drittenbass

It is hereby certified that error appears in the above numbered patent requiring correction and that the said Letters Patent should read as corrected below.

Column 2, line 43, for "0.1" read -- 0.01 --.

Signed and sealed this 8th day of September 1964.

(SEAL)
Attest:

ERNEST W. SWIDER                                       EDWARD J. BRENNER
Attesting Officer                                           Commissioner of Patents